United States Patent
Yang et al.

(10) Patent No.: US 10,958,994 B2
(45) Date of Patent: Mar. 23, 2021

(54) METHOD AND DEVICE FOR CONTROLLING DOWNLINK OPTICAL SIGNAL, AND COMPUTER-READABLE STORAGE MEDIUM

(71) Applicant: ZTE CORPORATION, Guangdong (CN)

(72) Inventors: Wei Yang, Guangdong (CN); Xingang Huang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/649,783

(22) PCT Filed: Sep. 21, 2018

(86) PCT No.: PCT/CN2018/107047
§ 371 (c)(1),
(2) Date: Mar. 23, 2020

(87) PCT Pub. No.: WO2019/057172
PCT Pub. Date: Mar. 28, 2019

(65) Prior Publication Data
US 2020/0280772 A1    Sep. 3, 2020

(30) Foreign Application Priority Data

Sep. 21, 2017   (CN) .......................... 201710858676.8

(51) Int. Cl.
*H04Q 11/00*    (2006.01)
*H04B 10/079*   (2013.01)
(Continued)

(52) U.S. Cl.
CPC ....... *H04Q 11/0067* (2013.01); *H04B 10/079* (2013.01); *H04B 10/294* (2013.01); *H04J 14/0246* (2013.01)

(58) Field of Classification Search
None
See application file for complete search history.

(56) References Cited

U.S. PATENT DOCUMENTS

2005/0163508 A1* 7/2005 Hwang ................... H04J 14/02
                                                            398/71
2008/0298807 A1* 12/2008 Yang .................. H04Q 11/0067
                                                            398/98
(Continued)

FOREIGN PATENT DOCUMENTS

CN        101026416 A     8/2007
CN        101615956 A    12/2009
(Continued)

OTHER PUBLICATIONS

WIPO, International Search Report dated Nov. 30, 2018.

*Primary Examiner* — Darren E Wolf
(74) *Attorney, Agent, or Firm* — Houtteman Law LLC (57) ABSTRACT

The present disclosure provides a method and a device for controlling a downlink optical signal in a passive optical network, and a computer-readable storage medium. The method includes: monitoring power of a downlink optical signal in a process of receiving the downlink optical signal; and adjusting an attenuation value of a variable optical attenuator at an ONU side according to the power of the downlink optical signal until the power of the downlink optical signal falls within a preset power range. The variable optical attenuator at the ONU side is located between an optical splitter and an ONU.

15 Claims, 6 Drawing Sheets

(51) Int. Cl.
*H04B 10/294* (2013.01)
*H04J 14/02* (2006.01)

(56) References Cited

U.S. PATENT DOCUMENTS

| | | | | |
|---|---|---|---|---|
| 2009/0208211 A1* | 8/2009 | Tamai | .................. | H04B 10/272 |
| | | | | 398/67 |
| 2012/0251100 A1* | 10/2012 | Rope | .................. | H04B 10/0799 |
| | | | | 398/25 |
| 2014/0369683 A1* | 12/2014 | Smolorz | ................ | H04B 10/27 |
| | | | | 398/58 |

FOREIGN PATENT DOCUMENTS

| | | | | |
|---|---|---|---|---|
| CN | 106550290 A | 3/2017 | | |
| WO | WO-2016161859 A1 * | 10/2016 | ........... | H04B 10/294 |
| WO | WO 2016161859 A1 | 10/2016 | | |

\* cited by examiner

METHOD AND DEVICE FOR CONTROLLING DOWNLINK OPTICAL SIGNAL, AND COMPUTER-READABLE STORAGE MEDIUM

CROSS-REFERENCE TO RELATED APPLICATIONS

This is a National Phase Application filed under 35 U.S.C. 371 as a national stage of PCT/CN2018/107047, filed on Sep. 21, 2018, an application claiming the priority of Chinese Patent Application No. 201710858676.8, filed on Sep. 21, 2017, the contents of which are incorporated herein in their entirety by reference.

TECHNICAL FIELD

The present disclosure relates to the field of optical access technology, and in particular, to a method and a device for controlling a downlink optical signal in a passive optical network, and a computer-readable storage medium.

BACKGROUND

At present, the technology of Passive Optical Network (PON) is being continuously updated. However, as a single-wavelength modulation rate increases, receiver sensitivity decreases, resulting in a decrease in link power budget. Since an Optical Distribution Network (ODN) cannot be changed, how to increase the link power budget has become a problem which must be solved.

It is one of the effective solutions to the above problem to add an amplifier in a PON to increase transmission optical power of a transmitter or to increase receiving optical power of a receiver. For example, an optical amplifier (OA) may be added at an optical line terminal (OLT) side to increase transmission optical power. However, in a PON system, attenuation of links from different optical network units (ONUs) to an OLT differs, with a maximum difference of 15 dB. In a case that an optical amplifier is added at the OLT side to increase power of a downlink optical signal, when an ONU, whose initial receiving optical power is minimum, is in an appropriate receiving optical power range, a receiving optical power of an ONU, whose initial receiving optical power is maximum, may exceed a damage threshold, resulting in damage to an optical receiver. It can be seen that there is a risk of amplifying a downlink optical signal only by a fixed gain.

SUMMARY

According to an aspect of the present disclosure, a method for controlling a downlink optical signal in a passive optical network is provided and is applied to an ONU, and the method includes the following steps: monitoring power of a downlink optical signal in a process of receiving the downlink optical signal; and adjusting an attenuation value of a variable optical attenuator at an ONU side according to the power of the downlink optical signal until the power of the downlink optical signal falls within a preset power range, where the variable optical attenuator at the ONU side is located between an optical splitter and the ONU.

According to another aspect of the present disclosure, a device for controlling a downlink optical signal in a passive optical network is further provided and is applied to an ONU, and the device includes a signal monitoring module configured to monitor power of a downlink optical signal in a process of receiving the downlink optical signal; and a first adjustment module configured to adjust an attenuation value of a variable optical attenuator at an ONU side according to the power of the downlink optical signal until the power of the downlink optical signal falls within a preset power range, where the variable optical attenuator at the ONU side is located between an optical splitter and the ONU.

According to another aspect of the present disclosure, a device for controlling a downlink optical signal in a passive optical network is further provided and is applied to an ONU, and the device includes a processor, a memory and a communication bus. The communication bus is configured to realize connection and communication between the processor and the memory, and the processor is configured to execute programs stored in the memory for controlling a downlink optical signal in a passive optical network, so as to perform the steps of the above method for controlling a downlink optical signal in a passive optical network.

According to another aspect of the present disclosure, a computer-readable storage medium is further provided, and stores one or more programs capable of being executed by one or more processors, so as to perform the steps of the above method for controlling a downlink optical signal in a passive optical network.

DETAILED DESCRIPTION

To further describe the technical solutions taken by the present disclosure to achieve the intended objectives and the technical effects, the present disclosure is described in detail below with reference to the accompanying drawings and exemplary embodiments.

Figure 1:
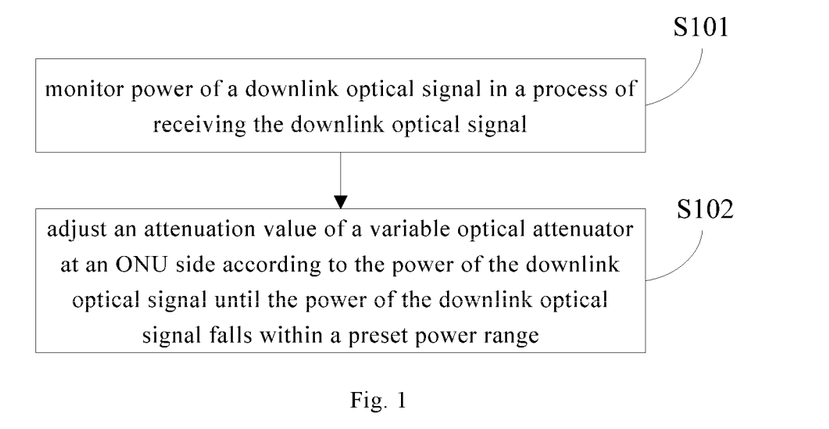
FIG. 1 is a flowchart illustrating a method for controlling a downlink optical signal in a passive optical network according to an embodiment of the present disclosure.

According to an embodiment of the present disclosure, a method for controlling a downlink optical signal in a passive optical network is provided and is applied at an ONU side. As shown in FIG. 1, the method includes step S101 and step S102.

In step S101, power of a downlink optical signal is monitored in a process of receiving the downlink optical signal.

An ONU is powered on, an optical receiver is turned on to receive a downlink optical signal through the optical receiver, and power of the downlink optical signal is monitored.

In step S102, an attenuation value of a variable optical attenuator at an ONU side is adjusted according to the power of the downlink optical signal until the power of the downlink optical signal falls within a preset power range.

Figure 2:
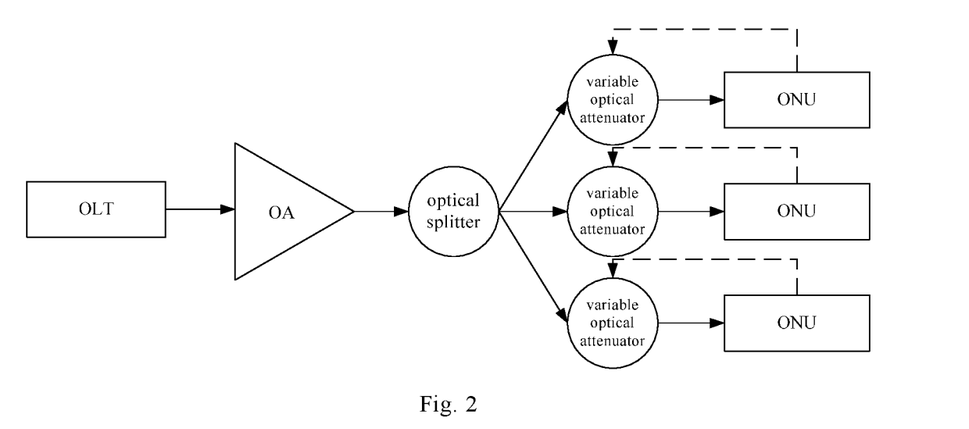
FIG. 2 is a schematic diagram of a PON system according to an embodiment of the present disclosure.

FIG. 2 is a schematic diagram of a PON system according to an embodiment of the present disclosure. The PON system includes an OLT, an OA, an optical splitter, variable optical attenuators and ONUs.

In one embodiment, the OA is located between the OLT and the optical splitter. A branch of each ONU is provided thereon with a variable optical attenuator, which is located between the optical splitter and the ONU.

A downlink optical signal transmitted by the OLT is amplified by the OA, and then passes through the optical splitter, and enters the branch of each ONU.

The ONU adjusts an attenuation value of the variable optical attenuator according to power of a received downlink optical signal, stops adjusting the attenuation value of the variable optical attenuator when the power of the downlink optical signal falls within a power range in which the ONU can correctly receive a signal, starts waiting for a register window of the OLT to perform registration in the register window.

In one embodiment, before receiving the downlink optical signal, the method further includes the following step: adjusting the attenuation value of the variable optical attenuator to a maximum value.

In one embodiment, the step of adjusting the attenuation value of the variable optical attenuator at the ONU side until the power of the downlink optical signal falls within the preset power range includes the following step: gradually reducing the attenuation value of the variable optical attenuator until the power of the downlink optical signal falls within a preset power range.

Before turning on the optical receiver, the ONU adjusts the attenuation value of the variable optical attenuator to the maximum value, so as to allow the optical receiver to receive a downlink optical signal with minimum power. And then the ONU gradually reduces the attenuation value of the variable optical attenuator according to the monitored power of the downlink optical signal to allow the optical receiver to receive a downlink optical signal with relatively large power.

In one embodiment, after the power of the downlink optical signal falls within the preset power range, the method further includes the following step: performing registration by the ONU, and sending an adjusted attenuation value of the variable optical attenuator to the OLT by the ONU, so that the OLT can simultaneously reduce a gain value of the OA at an OLT side and attenuation values of the variable optical attenuators at the sides of all registered ONUs according to the attenuation values sent by all registered ONUs.

When the register window of the OLT ends, each successfully registered ONU sends an adjusted attenuation value of the variable optical attenuator thereof to the OLT; and the OLT determines a minimum attenuation value I among the received attenuation values, and then simultaneously reduces a gain value of the OA at the OLT side by I and reduces attenuation values of the variable optical attenuators at the sides of all successfully registered ONUs by I, so that power of a downlink optical signal received by all successfully registered ONUs is unchanged and is still optimal receiving optical power, while energy is effectively saved by reducing the gain of the OA at the OLT side.

When the OLT re-enters a register window, the OLT simultaneously increases the gain value of the OA at the OLT side by I and increases the attenuation values of the variable optical attenuators at the sides of previously successfully registered ONUs by I. When the new register window ends, the OLT reduces the gain of the OA at the OLT side through the above method.

In one embodiment, the variable optical attenuator may be integrated with an ONU. The integration of the variable optical attenuator is achieved through a Micro-Electro-Mechanical System (MEMS).

In one embodiment, after the ONU is successfully registered, the ONU continuously receives downlink optical signals transmitted by the OLT, and adjusts the attenuation value of the variable optical attenuator in real time according to monitored power of the downlink optical signals, so as to keep the power of the received downlink optical signals in an optimal receiving range of the optical receiver all the time.

In one embodiment, the OA may also be integrated with an ONU. The integration of the OA is achieved through a Semiconductor Optical Amplifier (SOA).

Figure 3:
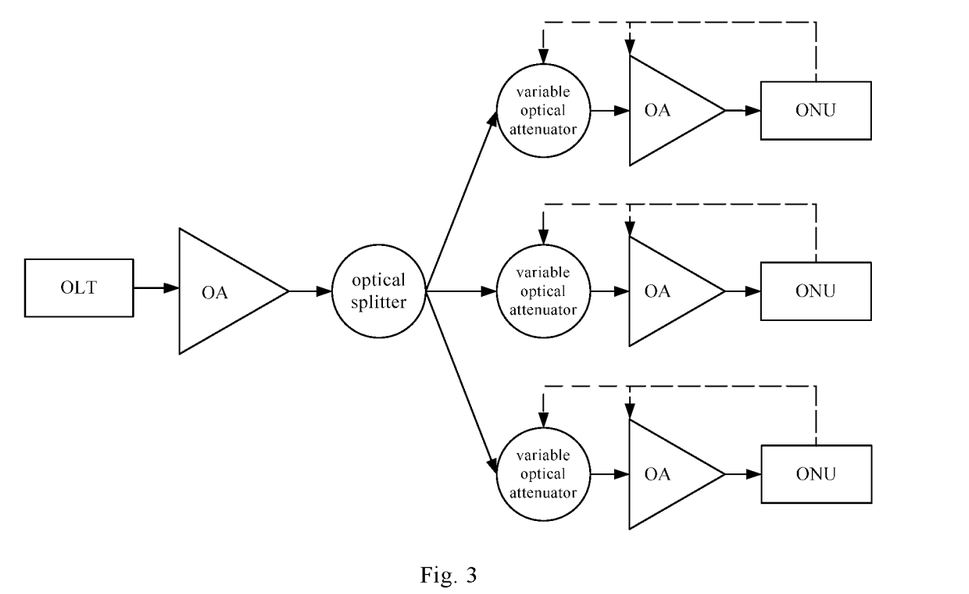
FIG. 3 is another schematic diagram of a PON system according to an embodiment of the present disclosure.
Figure 4:
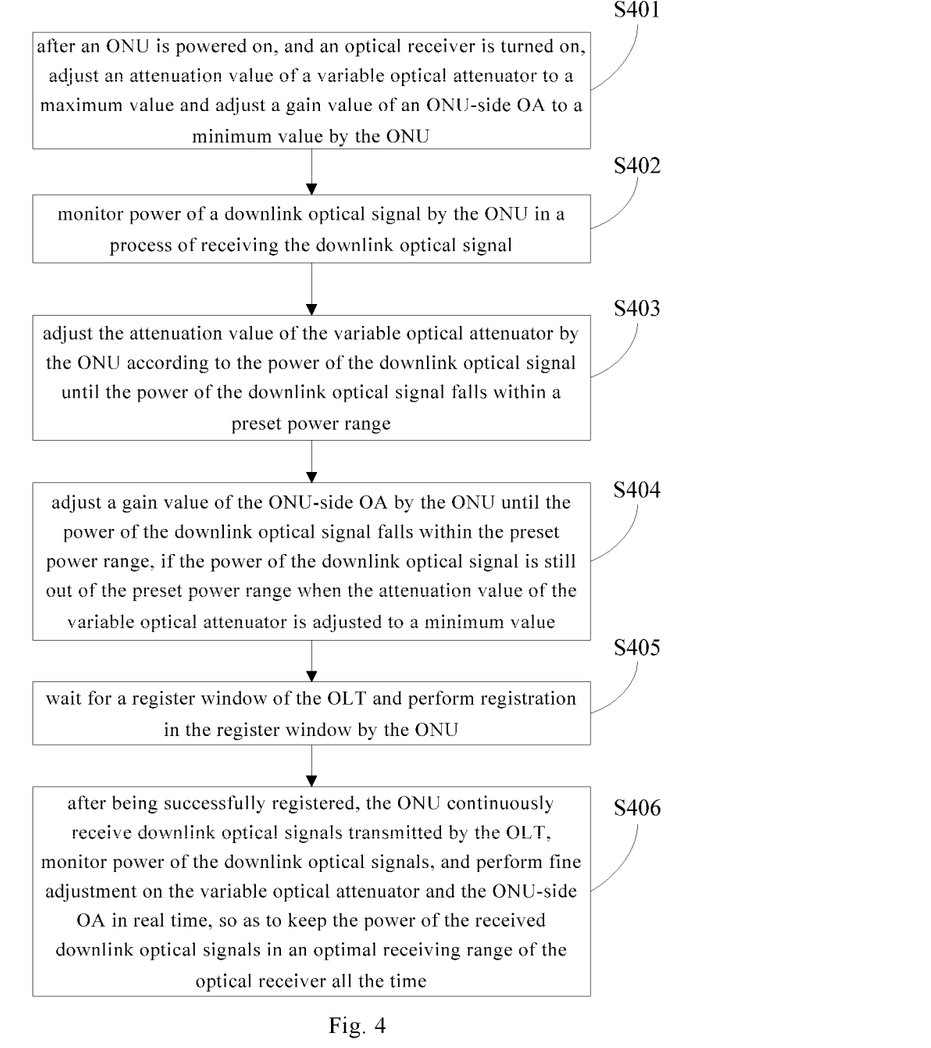
FIG. 4 is another flowchart illustrating a method for controlling a downlink optical signal in a passive optical network according to an embodiment of the present disclosure.

The present disclosure provides a method for controlling a downlink optical signal in a passive optical network, which is applied at an ONU side in a passive optical network system shown in FIG. 3 which includes an OLT, an OLT-side OA, an optical splitter, variable optical attenuators, ONU-side OAs and ONUs. As shown in FIG. 4, the method includes steps S401 to S406.

The OLT-side OA may be an OA located at or connected to the OLT, and an ONU-side OA may be an OA located at or connected to an ONU.

In one embodiment, the OLT-side OA is located between the OLT and the optical splitter; and a variable optical attenuator and an ONU-side OA are provided on a branch of each ONU, and are located between the optical splitter and the ONU. The positions of the variable optical attenuator and the ONU-side OA may be interchanged.

A downlink optical signal transmitted by the OLT is amplified by the OLT-side OA, and then passes through the optical splitter, and enters the branch of each ONU.

In step S401, an ONU is powered on, and an optical receiver is turned on, and then an attenuation value of the variable optical attenuator is adjusted to a maximum value and a gain value of the ONU-side OA is adjusted to a minimum value by the ONU.

In step S402, power of a downlink optical signal is monitored by the ONU in a process of receiving the downlink optical signal.

In step S403, an attenuation value of the variable optical attenuator is adjusted by the ONU according to the power of the downlink optical signal until the power of the downlink optical signal falls within a preset power range.

In one embodiment, the step S403 includes gradually reducing the attenuation value of the variable optical attenuator by the ONU until the power of the downlink optical signal falls within a preset power range.

In step S404, if the power of the downlink optical signal is still out of the preset power range when the attenuation value of the variable optical attenuator is adjusted to a minimum value, a gain value of the ONU-side OA is adjusted by the ONU until the power of the downlink optical signal falls within the preset power range.

If the power of the downlink optical signal is still out of the power range in which the ONU may correctly receive a signal when the attenuation value of the variable optical attenuator is adjusted to the minimum value, it indicates that the power of the downlink optical signal that has been amplified by the OLT-side OA is still not large enough, the power of the downlink optical signal needs to be further increased by the ONU-side OA until the ONU may correctly receive the downlink optical signal.

In one embodiment, step S404 includes gradually increasing the gain value of the ONU-side OA by the ONU until the power of the downlink optical signal falls within the preset power range.

In step S405, the ONU waits for a register window of the OLT and performs registration in the register window.

In step S406, after being successfully registered, the ONU continuously receives downlink optical signals transmitted by the OLT, monitors power of the downlink optical signals, and performs fine adjustment on the variable optical attenuator and the ONU-side OA in real time, so as to keep the power of the received downlink optical signals man optimal receiving range of the optical receiver all the time.

Figure 5:
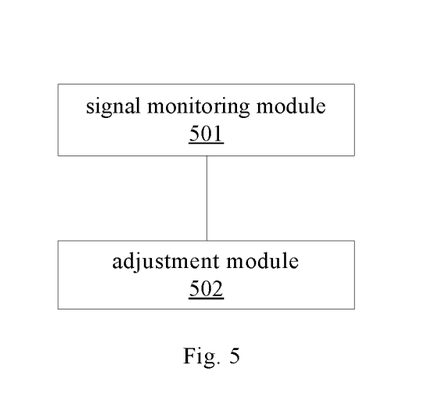
FIG. 5 is a schematic structural diagram of a device for controlling a downlink optical signal in a passive optical network according to an embodiment of the present disclosure.

The present disclosure provides a device for controlling a downlink optical signal in a passive optical network, which is applied at an ONU side. As shown in FIG. 5, the device specifically includes a signal monitoring module 501 and an adjustment module 502.

The signal monitoring module 501 is configured to monitor power of a downlink optical signal in a process of receiving the downlink optical signal.

An ONU is powered on, an optical receiver is turned on to receive a downlink optical signal through the optical receiver, and power of the downlink optical signal is monitored.

The adjustment module 502 is configured to adjust an attenuation value of a variable optical attenuator at an ONU side according to the power of the downlink optical signal until the power of the downlink optical signal falls within a preset power range.

The device may be applied to a PON system shown in FIG. 2 which includes an OLT, an OA, an optical splitter, variable optical attenuators and ONUs.

In one embodiment, the OA is located between the OLT and the optical splitter; and a branch of each ONU is provided thereon with a variable optical attenuator, which is located between the optical splitter and the ONU.

A downlink optical signal transmitted by the OLT is amplified by the OA, and then passes through the optical splitter, and enters the branch of each ONU.

The ONU adjusts an attenuation value of the variable optical attenuator according to power of a received downlink optical signal, stops adjusting the attenuation value of the variable optical attenuator when the power of the downlink optical signal falls within a power range in which the ONU may correctly receive a signal, starts waiting for a register window of the OLT, and performs registration in the register window.

In one embodiment, the device further includes a control adjustment module.

The control adjustment module is configured to adjust an attenuation value of the variable optical attenuator to a maximum value before receiving the downlink optical signal.

In one embodiment, the adjustment module 502 is further configured to gradually reduce the attenuation value of the variable optical attenuator until the power of the downlink optical signal falls within the preset power range.

Before the ONU turns on the optical receiver, the attenuation value of the variable optical attenuator is adjusted to the maximum value through the control adjustment module, so as to allow the optical receiver to receive a downlink optical signal with minimum power. And then, the ONU gradually reduces the attenuation value of the variable optical attenuator with the adjustment module 502 according to the monitored power of the downlink optical signal to allow the optical receiver to receive a downlink optical signal with relatively large power.

In one embodiment, the device further includes a feedback module.

The feedback module is configured to send an adjusted attenuation value of the variable optical attenuator to the OLT when the ONU performs registration after the power of the downlink optical signal falls within the preset power range, so that the OLT may simultaneously reduce a gain value of the OA at an OLT side and attenuation values of the variable optical attenuators at the sides of all registered ONUs according to the attenuation values sent by all registered ONUs.

When the register window of the OLT ends, each successfully registered ONU sends an adjusted attenuation value of the variable optical attenuator thereof through the feedback module to the OLT; and the OLT determines a minimum attenuation value I among the received attenuation values, and then simultaneously reduces a gain value of the OA at the OLT side by I and reduces attenuation values of the variable optical attenuators at the sides of all successfully registered ONUs by I, so that power of a downlink optical signal received by all successfully registered ONUs is unchanged and is still optimal receiving optical power, while energy is effectively saved by reducing the gain of the OA at the OLT side.

When the OLT re-enters a register window, the OLT simultaneously increases the gain value of the OA at the OLT side by I and increases the attenuation values of the variable optical attenuators at the sides of previously successfully registered ONUs by I. When the new register window ends, the OLT reduces the gain of the OA at the OLT side through the above method.

In one embodiment, the variable optical attenuator may be integrated with an ONU. The integration of the variable optical attenuator is achieved through a MEMS.

The present disclosure provides a device for controlling a downlink optical signal in a passive optical network, which is applied at an ONU side in a PON system shown in FIG. 3 which includes an OLT, an OLT-side OA, an optical splitter, variable optical attenuators, ONU-side OAs and ONUs.

In one embodiment, the OLT-side OA is located between the OLT and the optical splitter; and a variable optical attenuator and an ONU-side OA are provided on a branch of each ONU, and are located between the optical splitter and the ONU. The positions of the variable optical attenuator and the ONU-side OA may be interchanged.

A downlink optical signal transmitted by the OLT is amplified by the OLT-side OA, and then passes through the optical splitter, and enters the branch of each ONU.

Figure 6:
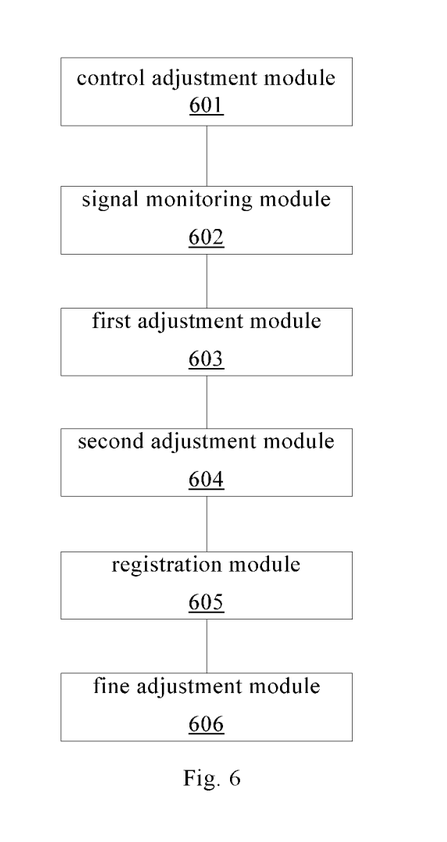
FIG. 6 is another schematic structural diagram of a device for controlling a downlink optical signal in a passive optical network according to an embodiment of the present disclosure.

As shown in FIG. 6, the device specifically includes a control adjustment module 601, a signal monitoring module 602, a first adjustment module 603, a second adjustment module 604, a registration module 605, and a fine adjustment module 606.

The control adjustment module 601 is configured to adjust an attenuation value of the variable optical attenuator to a maximum value and adjust a gain value of the ONU-side OA to a minimum value after the ONU is powered on and an optical receiver is turned on.

The signal monitoring module 602 is configured to monitor power of a downlink optical signal in a process of receiving the downlink optical signal.

The first adjustment module 603 is configured to adjust the attenuation value of the variable optical attenuator according to the power of the downlink optical signal until the power of the downlink optical signal falls within a preset power range.

In one embodiment, the first adjustment module 603 is configured to gradually reduce the attenuation value of the variable optical attenuator until the power of the downlink optical signal falls within a preset power range.

The second adjustment module 604 is configured to adjust the gain value of the ONU-side OA until the power of the downlink optical signal falls within the preset power range, if the power of the downlink optical signal is still out of the preset power range when the attenuation value of the variable optical attenuator is adjusted to a minimum value.

If the power of the downlink optical signal is still out of the power range in which the ONU may correctly receive a signal when the attenuation value of the variable optical attenuator is adjusted to the minimum value, it indicates that the power of the downlink optical signal that has been amplified by the OLT-side OA is still not large enough, the power of the downlink optical signal needs to be further increased by the ONU-side OA until the ONU may correctly receive the downlink optical signal.

In one embodiment, the second adjustment module 604 is configured to gradually increase the gain value of the ONU-side OA until the power of the downlink optical signal falls within the preset power range.

The registration module 605 is configured to wait for a register window of the OLT and perform registration in the register window.

The fine adjustment module 606 is configured to, after the registration is successfully completed, continuously receive downlink optical signals transmitted by the OLT, monitor power of the downlink optical signals, and perform fine adjustment on the variable optical attenuator and the ONU-side OA in real time, so as to keep the power of the received downlink optical signals in an optimal receiving range of the optical receiver all the time.

Figure 7:
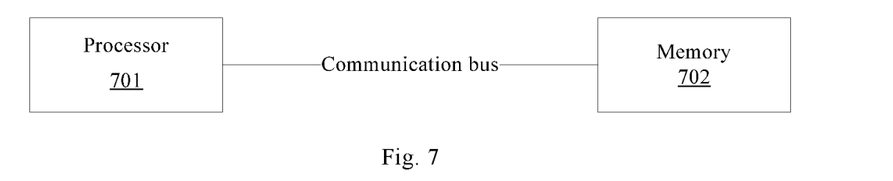
FIG. 7 is another schematic structural diagram of a device for controlling a downlink optical signal in a passive optical network according to an embodiment of the present disclosure.

The present disclosure provides a device for controlling a downlink optical signal in a passive optical network, which is applied to an ONU. As shown in FIG. 7, the device includes a processor 701, a memory 702, and a communication bus.

The communication bus is configured to realize connection and communication between the processor 701 and the memory 702.

The processor 701 is configured to execute programs stored in the memory 702 for controlling a downlink optical signal in a PON, so as to perform the following steps: monitoring power of a downlink optical signal in a process of receiving the downlink optical signal; and adjusting an attenuation value of a variable optical attenuator at an ONU side according to the power of the downlink optical signal until the power of the downlink optical signal falls within a preset power range.

The present disclosure further provides a computer-readable storage medium which stores one or more programs capable of being executed by one or more processors to perform the steps of the above method for controlling a downlink optical signal in a passive optical network.

With the method and the device for controlling a downlink optical signal in a passive optical network, and the computer-readable storage medium according to the embodiments of the present disclosure, the power of the downlink optical signal received by the ONU is adjusted to optimal receiving power of the optical receiver of the ONU by adjusting the variable optical attenuator and the OA at the ONU side, which solves the problems that the optical receiver is damaged due to excessive power of the downlink optical signal received at the ONU side when the OA is provided at the OLT side, and that the power of the downlink optical signal received at the ONU side is out of the optimal receiving range of the optical receiver.

Through the description of the specific embodiments, the technical solutions taken by the present disclosure to achieve the intended objectives and the technical effects should be understood deeply and specifically. It should be noted that the accompanying drawings are merely for reference and illustration, and are not intended to limit the present disclosure.

What is claimed is:

1. A method for controlling a downlink optical signal in a passive optical network, which is applied to an optical network unit (ONU), comprising:
   monitoring power of a downlink optical signal in a process of receiving the downlink optical signal; and
   adjusting an attenuation value of a variable optical attenuator at an ONU side according to the power of the downlink optical signal until the power of the downlink optical signal falls within a preset power range,
   wherein the variable optical attenuator at the ONU side is located between an optical splitter and the ONU;
   wherein after the power of the downlink optical signal falls within the preset power range, the method further comprises:
   performing registration by the ONU, and sending an adjusted attenuation value of the variable optical attenuator to an optical line terminal (OLT), so as to enable the OLT to simultaneously reduce a gain value of an optical amplifier (OA) at an OLT side and attenuation values of variable optical attenuators at the sides of all registered ONUs according to attenuation values sent by all registered ONUS, wherein the OA at the OLT side is located between the OLT and the optical splitter.

2. The method for controlling a downlink optical signal in a passive optical network of claim 1, wherein before receiving the downlink optical signal, the method further comprises:
   adjusting the attenuation value of the variable optical attenuator to a maximum value;
   and wherein the step of adjusting the attenuation value of the variable optical attenuator at the ONU side until the power of the downlink optical signal falls within the preset power range comprises:
   reducing the attenuation value of the variable optical attenuator.

3. The method for controlling a downlink optical signal in a passive optical network of claim 2, further comprising:
   in the process of receiving the downlink optical signal by a receiver, adjusting a gain value of an OA at the ONU side until the power of the downlink optical signal falls within the preset power range, if the power of the downlink optical signal is still out of the preset power range when the attenuation value of the variable optical attenuator is adjusted to a minimum value,
   wherein the OA at the ONU side is located between the optical splitter and the ONU.

4. The method for controlling a downlink optical signal in a passive optical network of claim 3, wherein before receiving the downlink optical signal, the method further comprises:
adjusting the gain value of the OA at the ONU side to a minimum value;
and wherein the step of adjusting the gain value of the OA at the ONU side until the power of the downlink optical signal falls within the preset power range comprises:
increasing the gain value of the OA at the ONU side.

5. A device for controlling a downlink optical signal in a passive optical network, which is applied to an optical network unit (ONU), comprising a processor, a memory, and a communication bus, wherein
the communication bus is configured to realize connection and communication between the processor and the memory; and
the processor is configured to execute programs stored in the memory to perform:
monitoring power of a downlink optical signal in a process of receiving the downlink optical signal; and
adjusting an attenuation value of a variable optical attenuator at an ONU side according to the power of the downlink optical signal until the power of the downlink optical signal falls within a preset power range, wherein the variable optical attenuator at the ONU side is located between an optical splitter and the ONU;
wherein the processor is further configured to execute the programs to perform:
performing registration and sending an adjusted attenuation value of the variable optical attenuator to an optical line terminal (OLT), so as to enable the OLT to simultaneously reduce a gain value of an optical amplifier (OA) at an OLT side and attenuation values of variable optical attenuators at the sides of all registered ONUs according to attenuation values sent by all registered ONUs, wherein the OA at the OLT side is located between the OLT and the optical splitter.

6. A non-transitory computer-readable storage medium storing one or more programs which, when executed by one or more processors, cause the one or more processors to perform the method for controlling a downlink optical signal in a passive optical network of claim 1.

7. A method for controlling a downlink optical signal in a passive optical network, which is applied to an optical network unit (ONU), comprising:
monitoring power of a downlink optical signal in a process of receiving the downlink optical signal; and
adjusting an attenuation value of a variable optical attenuator at an ONU side according to the power of the downlink optical signal until the power of the downlink optical signal falls within a preset power range, wherein the variable optical attenuator at the ONU side is located between an optical splitter and the ONU;
wherein the method further comprises:
in the process of receiving the downlink optical signal by a receiver, adjusting a gain value of an optical amplifier (OA) at the ONU side until the power of the downlink optical signal falls within the preset power range, if the power of the downlink optical signal is still out of the preset power range when the attenuation value of the variable optical attenuator is adjusted to a minimum value, wherein the OA at the ONU side is located between the optical splitter and the ONU.

8. The method for controlling a downlink optical signal in a passive optical network of claim 7, wherein before receiving the downlink optical signal, the method further comprises:
adjusting the attenuation value of the variable optical attenuator to a maximum value; and
wherein the step of adjusting the attenuation value of the variable optical attenuator at the ONU side until the power of the downlink optical signal falls within the preset power range comprises:
reducing the attenuation value of the variable optical attenuator.

9. The method for controlling a downlink optical signal in a passive optical network of claim 8, wherein after the power of the downlink optical signal falls within the preset power range, the method further comprises:
performing registration by the ONU, and sending an adjusted attenuation value of the variable optical attenuator to an optical line terminal (OLT), so as to enable the OLT to simultaneously reduce a gain value of an OA at an OLT side and attenuation values of variable optical attenuators at the sides of all registered ONUs according to attenuation values sent by all registered ONUs, wherein the OA at the OLT side is located between the OLT and the optical splitter.

10. The method for controlling a downlink optical signal in a passive optical network of claim 7, wherein before receiving the downlink optical signal, the method further comprises:
adjusting the gain value of the OA at the ONU side to a minimum value; and
wherein the step of adjusting the gain value of the OA at the ONU side until the power of the downlink optical signal falls within the preset power range comprises:
increasing the gain value of the OA at the ONU side.

11. The device for controlling a downlink optical signal in a passive optical network of claim 5, wherein before receiving the downlink optical signal, the processor is further configured to execute the programs to perform:
adjusting the attenuation value of the variable optical attenuator to a maximum value; and
wherein the processor is further configured to execute the programs to perform:
reducing the attenuation value of the variable optical attenuator until the power of the downlink optical signal falls within the preset power range.

12. The device for controlling a downlink optical signal in a passive optical network of claim 11, wherein the processor is further configured to execute the programs to perform:
in the process of receiving the downlink optical signal by a receiver, adjusting a gain value of an OA at the ONU side until the power of the downlink optical signal falls within the preset power range, if the power of the downlink optical signal is still out of the preset power range when the attenuation value of the variable optical attenuator is adjusted to a minimum value, wherein the OA at the ONU side is located between the optical splitter and the ONU.

13. The device for controlling a downlink optical signal in a passive optical network of claim 12, wherein before receiving the downlink optical signal, the processor is further configured to execute the programs to perform:
adjusting the gain value of the OA at the ONU side to a minimum value; and
wherein the processor is further configured to execute the programs to perform:

increasing the gain value of the OA at the ONU side until the power of the downlink optical signal falls within the preset power range.

14. A device for controlling a downlink optical signal in a passive optical network, which is applied to an ONU, comprising a processor, a memory, and a communication bus, wherein
  the communication bus is configured to realize connection and communication between the processor and the memory; and
  the processor is configured to execute programs stored in the memory for controlling a downlink optical signal in a passive optical network to perform the method for controlling a downlink optical signal in a passive optical network of claim 7.

15. A non-transitory computer-readable storage medium storing one or more programs which, when executed by one or more processors, cause the one or more processors to perform the method for controlling a downlink optical signal in a passive optical network of claim 7.

\* \* \* \* \*